Figure 1:
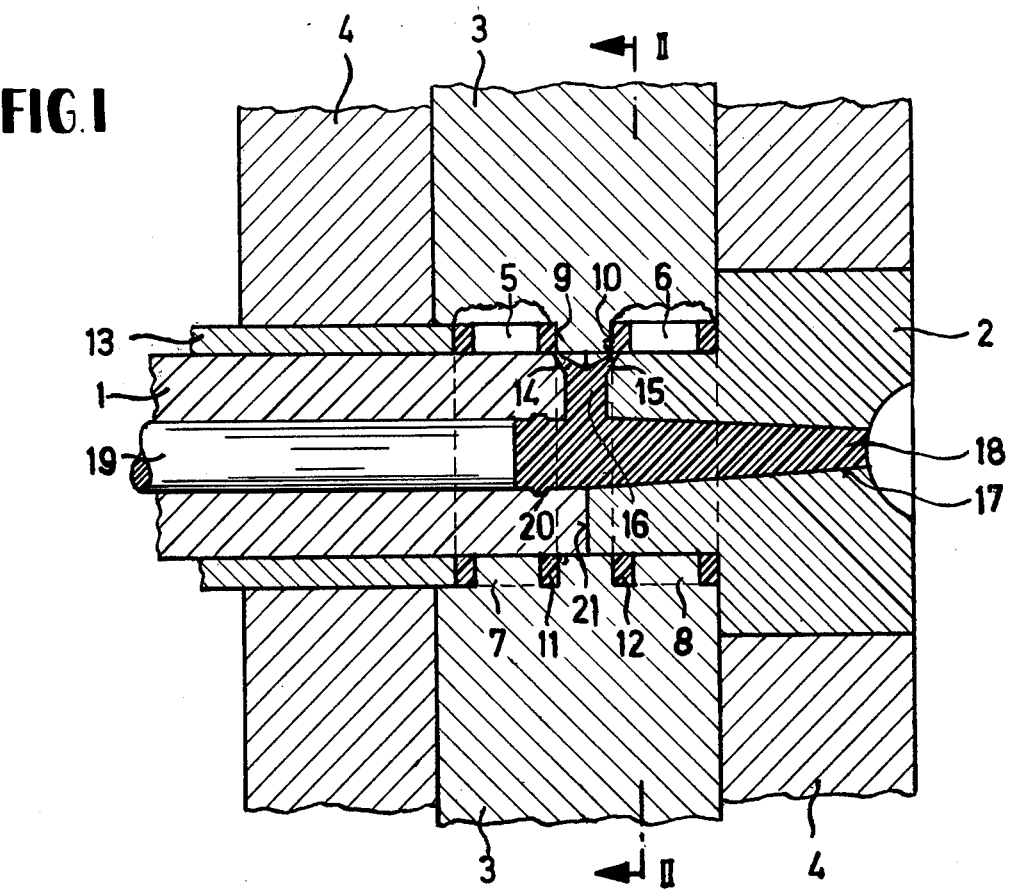

United States Patent [19]

Langhammer et al.

[11] 4,090,687
[45] May 23, 1978

[54] APPARATUS FOR PRODUCTION OF CAGES

[75] Inventors: Hans Langhammer; Hans Loos, both of Herzogenaurach, Germany

[73] Assignee: Industriewerk Schaeffler OHG, Herzogenaurach, Germany

[21] Appl. No.: 768,485

[22] Filed: Feb. 14, 1977

Related U.S. Application Data

[63] Continuation of Ser. No. 576,570, May 12, 1975, abandoned.

[30] Foreign Application Priority Data

May 10, 1974 Germany .............................. 2422669

[51] Int. Cl.² .......................... F16C 33/46; B29C 1/14; B29D 31/00
[52] U.S. Cl. ..................................... 249/60; 249/122; 249/160; 164/346
[58] Field of Search ........................ 249/122, 60, 160; 164/346; 425/DIG. 34

[56] References Cited

U.S. PATENT DOCUMENTS

| 2,836,853 | 6/1958 | Altmann | 249/60 |
| 3,433,292 | 3/1969 | McDonald | 164/346 X |
| 3,795,382 | 3/1974 | Gruber | 249/60 |

Primary Examiner—Francis S. Husar
Assistant Examiner—John S. Brown
Attorney, Agent, or Firm—Hammond & Littell

[57] ABSTRACT

An apparatus for the production of plastic cages for radial roller bearings wherein the two end rings of the cage are joined by a plurality of crossbars distributed over their circumference comprising an injection-molding die with a cylindrical core corresponding to the inner diameter of the cage and an outer die element having radially moveable slides, the said injection-molding die being provided with recesses for the simultaneous production of at least two cages.

3 Claims, 3 Drawing Figures

APPARATUS FOR PRODUCTION OF CAGES

This is a continuation of Ser. No. 576,570, filed May 12, 1975, now abandoned.

STATE OF THE ART

Such injection-molding dies have been used for a long time for the manufacture of so-called window cages but a disadvantage is the relatively high production costs which are caused, on the one hand, by the costs of the die per se, and on the other hand, result from the fact that only one cage can be produced in an injection-molding cycle. This in turn has the effect, particularly in the production of large series, that the injection-molding machine is occupied for an extremely long time by one die so that the machine can not be utilized economically.

OBJECTS OF THE INVENTION

It is an object of the invention to provide an apparatus for producing plastic window cages in an economical manner while optimizing the production capacity of injection-molding machines.

It is a further object of the invention to provide injection-molding dies for window cages which can produce a plurality of cages per cycle.

These and other objects and advantages of the invention will become obvious from the following detailed description.

THE INVENTION

The novel apparatus of the invention for production of plastic cages for radial roller bearings comprised of two end rings joined by a plurality of crossbars distributed over the circumference of the end rings is comprised of an injection molding die having a cylindrical core corresponding to the inner diameter of the cages and an outer die element having radial moveable slides, the injection-molding die having a plurality of recesses for the simultaneous production of a plurality of cages arranged coaxially in space relationship one behind the other, the exterior surfaces of the end faces of the end rings facing each other being formed by the slides of the outer die.

The problems of the prior art are solved by the invention as the injection-molding die is provided with recesses for the simultaneous production of at least two cages, which are arranged coaxially in space relation one behind the other, the exterior surfaces of the end faces of the end ring facing each other being formed by the slides. Such a design permits one to obtain a 100% increase in output for the injection-molding die with a slight increase in production costs which results not only in a considerable cost reduction for the individual cage but also reduces considerably the time during which the machine is occupied by the injection-molding die.

In another embodiment of the invention, each recess can have an initial injection channel which both terminate in a channel provided between the recesses and connected to the central injection channel in the core. This measure has the result that the initial injection channels terminating in the individual recesses can be kept very short, and thus have such a small diameter at their free end that the sprue can be torn off without any difficulty when the injection die is opened and a trouble-free injection molding cycle is ensured.

According to another feature of the invention, the core can be divided in a plane extending transverse to the longitudinal axis of the injection molding die, preferably it is designed so that the dividing plane extends between the recesses. Such an arrangement enhances, on the one hand, a smooth operation since the suggested location of the dividing plane permits the ejection of the sprue in a particularly simple manner and, on the other hand, the manufacture of the injection-molding die is simplified since the injection channels to be provided are arranged in the dividing plane.

Figure 2:
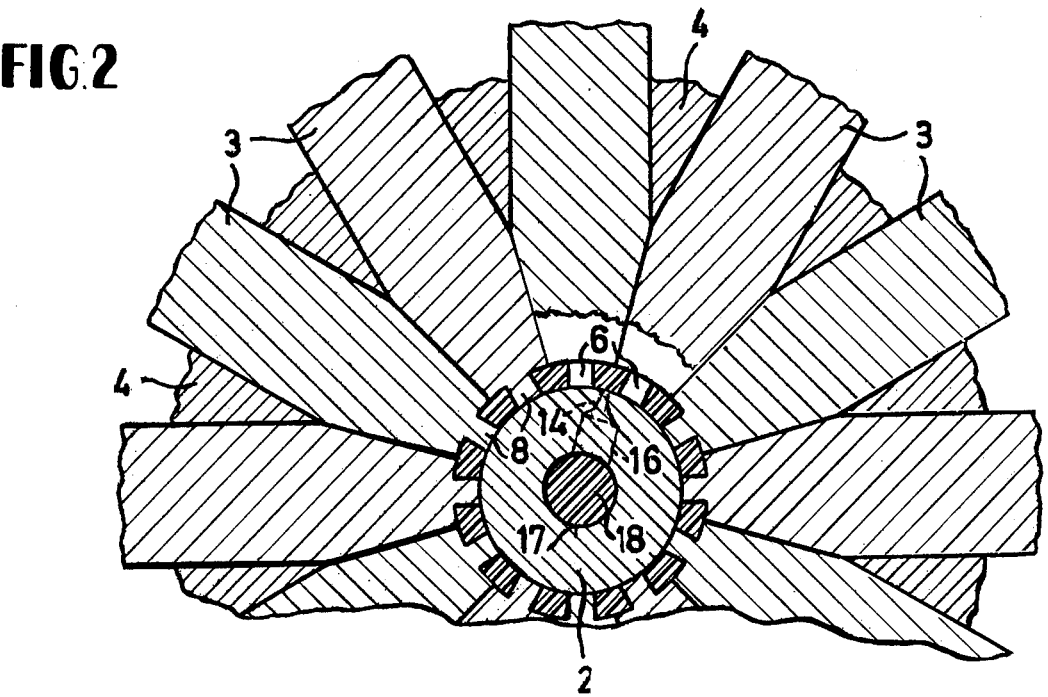
Figure 3:
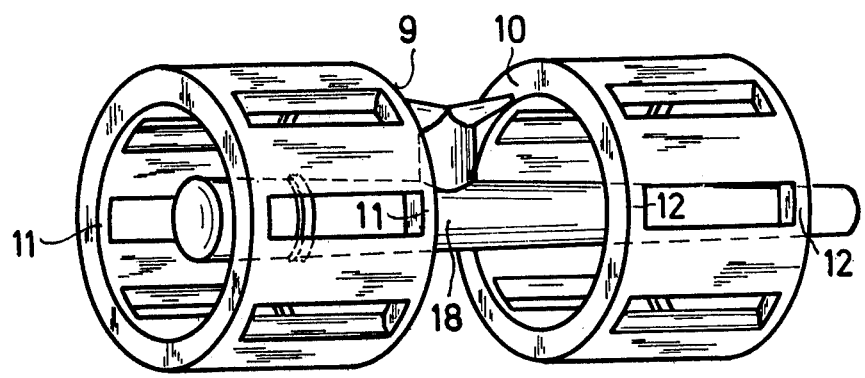

Referring now to the drawing:

FIG. 1 is a partial longitudinal section through one embodiment of an injection-moldng dies of the invention and FIG. 2 is a cross-section of the embodiment of FIG. 1 taken along the line II—II FIG. 3 is a perspective view of two finished cages produced in the embodiment of FIGS. 1 and 2.

The injection-molding die consists of cylindrical core elements 1 and 2, and the outer element 4 serving as a guide for slides 3. As can be seen particularly from FIG. 1, the injection-molding die has recesses 5 and 6 for the simultaneous production of two cages which recesses are arranged coaxially in space relation one behind the other. The recesses 5 and 6 are bounded radially to the outside by the slides 3 which also engage the recesses 5 and 6 with projections 7 and 8 to form cage pockets or windows.

In axial direction, the recesses 5 and 6 are also bounded by slides in the area of the end faces 9 and 10 of the end rings 11 and 12 facing each other, while the outer surface of recess 5 in the other axial direction is formed by the parts-ejector 13 and that of recess 6 by core part 2.

Each recess 5 and 6 is provided with an initial injection channel 14 and 15, respectively, which both terminate in channel 16 arranged between the recesses 5 and 6, and which is in communication with the central injection channel 17 in core parts 1 and 2. The initial injection channels 14 and 15 are so far reduced in their diameter at their ends facing the recesses 5 and 6 that they are easily separated from the end rings 11 and 12 when the finished cages are removed from the mold. To keep sprue 18 firmly in the central injection channel 17 until it is ejected by ejector 19, the central injection channel 17 is provided with an annular groove 20 in the area of core part 1. For ejecting sprue 18, core parts 1 and 2 can be divided in a plane extending transverse to the longitudinal axis of the injection-molding die. The dividing plane 21 is preferably arranged so that it extends between the recesses 5 and 6.

If a plastic composition is injected over the discharge nozzle (not shown) through the central injection channel 17, all cavities are filled so that two cages arranged axially in space relation one behind the other are formed in the recesses 5 and 6. For removing the finished cages, core part 2 is first extended in the axial direction, and the sprue is separated in the initial injection channel 15 from end ring 12. Then the radially movable slides 3 are pulled, and the cages, which are now exposed, are forced out from the die with parts-ejector 13. The sprue is separated in the initial injection channel 14 from end ring 11. The sprue 18, which was retained by clamping in the annular groove 20, is now ejected by means of ejector 19. This construction permits the complete removal of all plastic parts from the injection molding die, so that troubles in the injection molding cycle are positively avoided.

Various modifications of the apparatus of the invention may be made without departing from the spirit or scope thereof and it is to be understood that the invention is to be limited only as defined in the appended claims.

We claim:

1. An apparatus for the production of plastic cages for radial roller bearings comprising two end rings connected by a plurality of cross bars about their circumference comprising an injection molding die comprised of a cylindrical core corresponding to the inner diameter of the cage, an outer die element with a plurality of moveable slides radially positioned around said cylindrical core, each slide being provided with projections to form the cage pockets and cooperating with the core to form the cavity to create a plurality of roller bearing cages arranged coaxially in spaced relationship one behind the other, and means in said core for injecting plastic into said cavity.

2. An apparatus of claim 1 wherein the core is divided in a plane extending transversely to the longitudinal axis of the injection molding die.

3. An apparatus of claim 2 wherein the dividing plane is arranged between the recesses.

* * * * *